July 7, 1970  W. E. LERWILL  3,519,351
NON-CONTACT SPEED MEASUREMENT

Filed Oct. 24, 1968  3 Sheets-Sheet 1

INVENTORS:
WILLIAM EDWARD LERWILL

July 7, 1970  W. E. LERWILL  3,519,351
NON-CONTACT SPEED MEASUREMENT
Filed Oct. 24, 1968  3 Sheets-Sheet 2

INVENTOR:
WILLIAM EDWARD LERWILL
BY: Mason, Kolehmainen, Rathburn & Wyss
ATT'YS

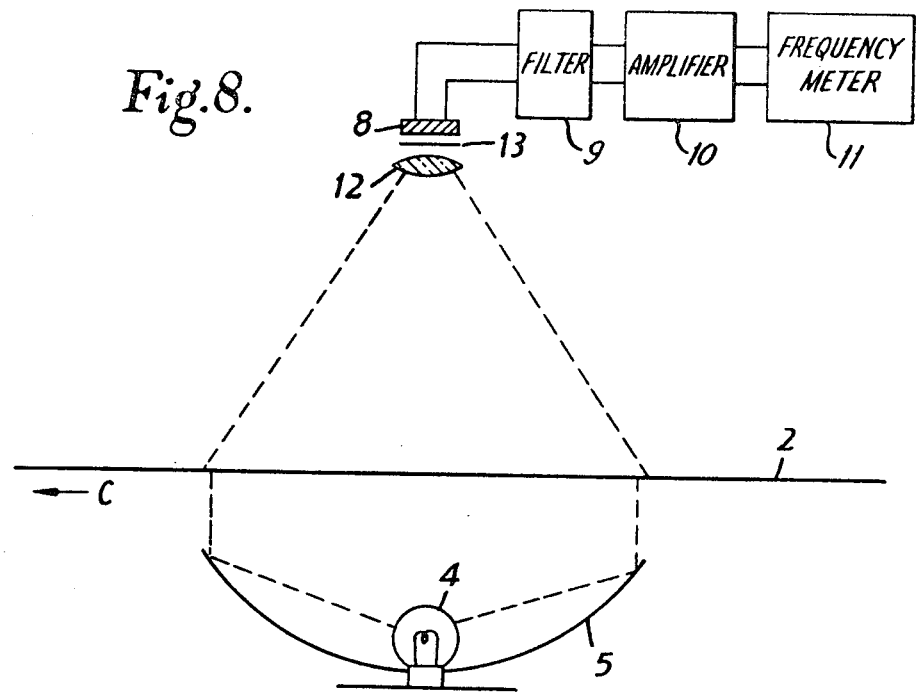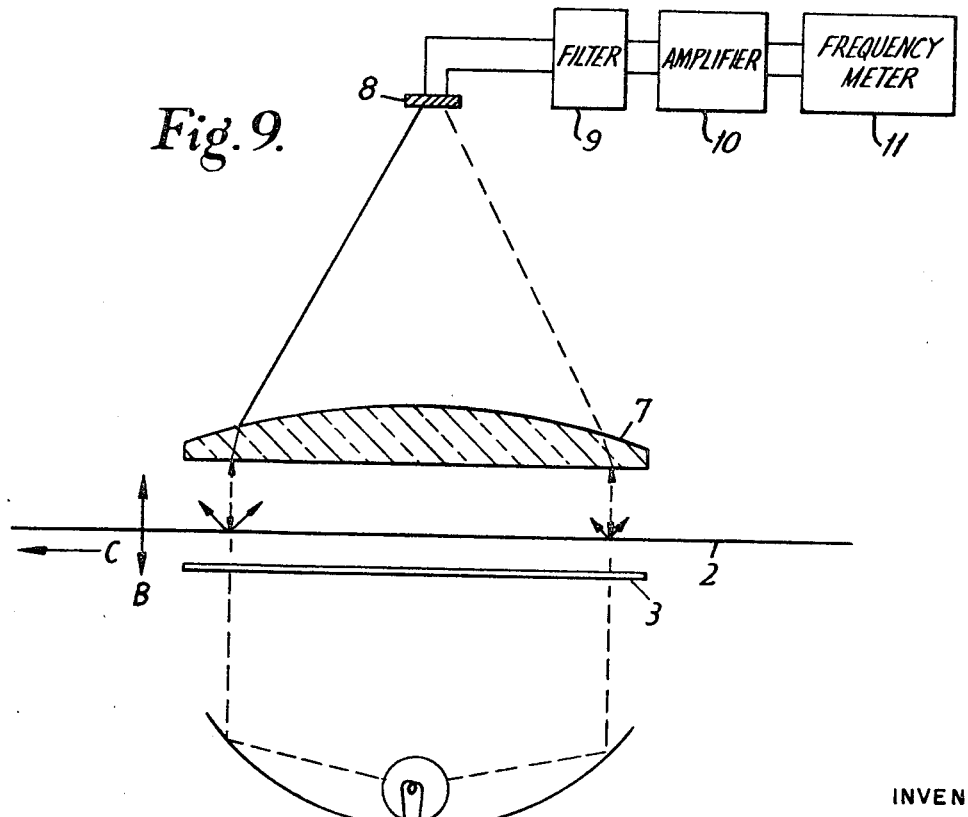

United States Patent Office 3,519,351
Patented July 7, 1970

3,519,351
NON-CONTACT SPEED MEASUREMENT
William Edward Lerwill, Keston, Kent, England, assignor to Seismograph Service Corporation, Tulsa, Okla.
Filed Oct. 24, 1968, Ser. No. 770,372
Claims priority, application Great Britain, Oct. 27, 1967, 49,006/67
Int. Cl. G01p *3/36;* G01n *21/30*
U.S. Cl. 356—28
20 Claims

ABSTRACT OF THE DISCLOSURE

A method and apparatus for measuring the velocity of a moving, irregular object. A beam of light is modulated by transmission through or reflection from the moving object, and the resultant modulated beam is cross-correlated by passage through a grid or other periodic filter to a photodetector. A frequency component whose frequency is proportional to the velocity of the object is then extracted from the signal generated by the photodetector, and is fed into a frequency meter. The frequency meter reading is then proportional to the speed of the object.

---

This invention relates to methods of and apparatus for measuring speeds, including rates of flow, and it is concerned more particularly with non-contact measurement—that is, the measurement of speeds without contact with the materials the speeds of which are being measured. Such non-contact measurement is often necessary, or at least desirable, for a number of reasons. These include the risk of damage to the material, whether in its finished state or during its production, and the fact that in-contact methods may not be sufficiently accurate.

Also, if it is desired to measure lengths without contact with the material, this can be done by measuring the speed of travel of the material over a given time and here again non-contact measurement is often desirable.

Examples of industries in which non-contact measurement can offer particular advantages include:

(1) The manufacture of paper (or similar materials);
(2) Steel rolling (or the rolling of other metals);
(3) The manufacture of cotton or other fibrous materials;
(4) The manufacture of sheets, rods or the like from plastics;
(5) Wire drawing, including the drawing of copper wire.

Measurement of the speed of fluids or fluid mixtures, particularly solid suspensions whether in a liquid or a gas, may also be needed.

Considering the manufacture of paper, the measurement of speeds, from the initial pulpy stage to the finished product by in-contact methods of measurement requires the use of paddles and idler rollers, or the like, driving tachometers or their equivalents, but the need for contact introduces serious difficulties, particularly while the paper is still in a pulpy or unfinished state. In-contact measurement can also cause damage in the finished product. Another example of where in-contact measurement is difficult or impracticable is in rolling mills, where the material may be too hot to be touched by a measuring device without damage to the latter or to the finished sheet.

A number of methods of non-contact measurement have been devised. In one, a light spot is projected onto the material the speed of which is to be measured and the light reflected from the material is received by a photo-electric cell. A slight unevenness in the surface of the material will cause a random-noise output signal to be produced from the cell. If two similar light-spot and cell assemblies are placed in line with each other in the direction of travel of the material their output signals will be coherent with each other if a delay is introduced into the first signal which is equal to the travel time of the material between the two light spots. This travel time can be found by cross-correlating the two signals and adjusting the delay to the first signal until maximum correlation is obtained.

Providing that the distance between the light spots is known, the speed of the material can be calculated from the time.

It is also possible to use a laser beam. This can be done by protecting the beam onto the surface of the material and measuring the Doppler-shift on the reflected beam or by projecting the beam onto the surface of the material and measuring the rotation of back-scatter lobes at a suitable distance from the material.

It is an object of the present invention to provide a method and also apparatus for the non-contact measurement of the speeds of materials, which method and apparatus are capable of a number of uses and are of value in practice. The apparatus used can be simple and economical, whilst still providing accurate measurement of speed. From this speed it is easy to calculate dimensions, particularly in length.

This invention provides a method of determining the velocity of a length of material as it moves past a station, the material being capable of amplitude modulation of radiation incident upon it comprising the steps of:

(a) causing a radiation beam to be incident on the material at the station,
(b) cross correlating the modulation pattern over an area of material with modulation wave form on the control member which has a radiation modulating waveform of constant wavelength extending in the direction of movement of the material, and
(c) determining the frequency of the cross-correlation function to provide the material velocity at the station.

The invention also provides an apparatus for the determination of the velocity of a length of material past a station the material being capable of amplitude modulation of radiation incident upon it, comprising (a) a source of radiation positioned to cause a radiation beam to be incident on an area,
(b) a radiation integrating device positioned so as to integrate radiation received from said area,
(c) means for positioning said material at said area along a direction of movement,
(d) a control member which carries a radiation modulating waveform of constant wavelength extending in the direction of movement of the material and is positioned so that radiation incident on said integrating device has passed through said waveform on the control member and
(e) frequency determining means supplied from said integrating device for displaying the frequency between the modulation on the material and the control member waveform.

In measuring the speed of the material, use is made of variations in the material, particularly natural variations in such properties as optical transmission or reflection or thickness or in the nature of the material.

This can be done by utilising the pattern in the moving material as part of a correlator filter without having to use a separate delay device, such as an external delay line or a magnetic tape recorder, which would be needed to produce a variable delay between the two signals if two photo-electric or other receiving cells were used, spaced from each other in the direction of travel.

In applying the invention, use is made both of the pattern of the material and a waveform on a control member having a known frequency pattern, which member is spaced from the moving material and is used, together with the latter, to control energy reaching a receiving and integrating unit, such as a photo-electric cell. From this unit a signal is obtained which represents a correlation of the two patterns.

The control member, according to a preferred feature of the invention, may take the form of an optical grating, or the equivalent, through which light from a suitable source is transmitted to a photo-electric cell, this light also being transmitted through or reflected from the surface of the moving material. Alternatively other forms of energy, such as suitable magnetic, radio, or sound waves, which are directed from a source onto or through the material the speed of which is to be measured might be used, providing that the material has properties, which may be natural or which may have been imparted to it, which have a random or other suitable pattern in the direction of the travel of the material. The pattern on the material is formed by the presence of modulation sub-areas. These sub-areas have sufficient radiation transmission or reflection properties to differentiate the sub-areas from the remainder of the material. For a paper sheet these sub-areas correspond to the flocking of the fibres. The control member used would have similar properties with a predetermined frequency pattern.

Considering the use of an optical system to measure the speed of paper, for example, or paper pulp, the wood pulp fibres provide a random pattern of light and dark shading. The pattern of this is reproduced in the random noise signal which is obtained by passing the paper or pulp through a light beam or by using light which is reflected from the surface of the material. This light passing through or reflected from the material is also controlled by the frequency pattern of the control member to provide an output signal from which the speed of travel of the material can be obtained, as will be described.

Embodiments of the apparatus according to the invention will now be described by way of example together with examples of the method of the invention with reference to the accompanying diagrammatic drawings in which.

Figure 2:
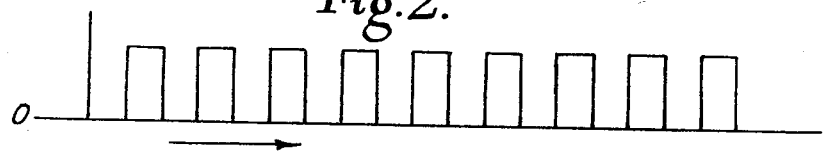
FIG. 2 shows the waveform of the grating, which is taken to have a maximum intensity of one.
Figure 4:
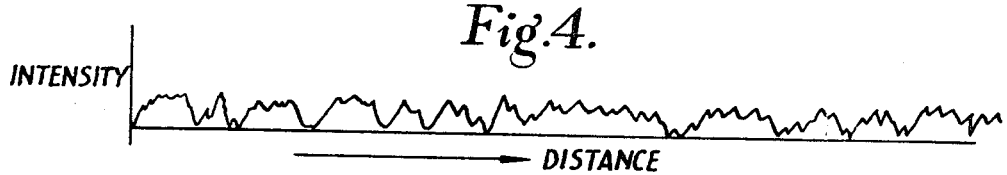

FIG. 4 indicates diagrammatically the waveform of a signal which might be produced from a narrow strip (between the lines A and $A_1$) of the material, in the same manner as FIG. 2.

Figure 5:
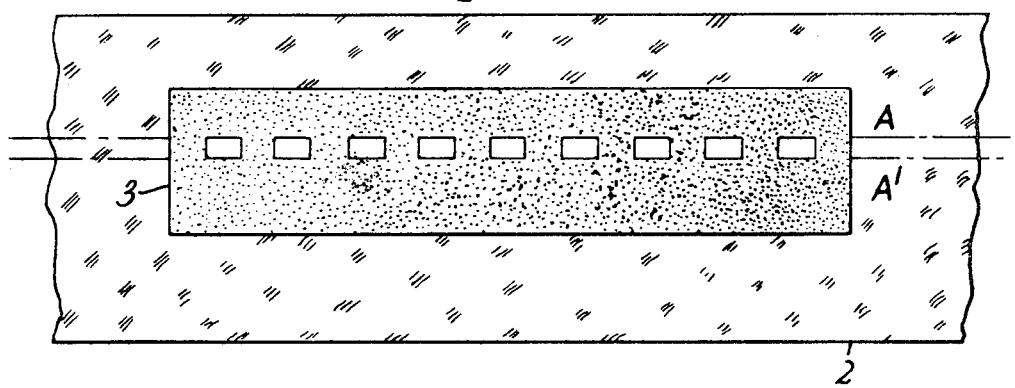
Figure 6:
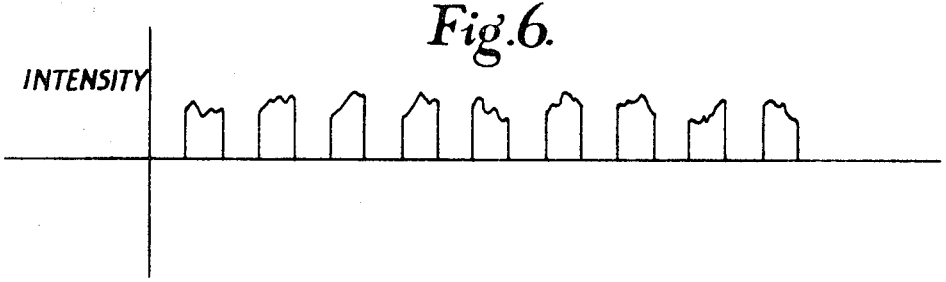
Figure 7:
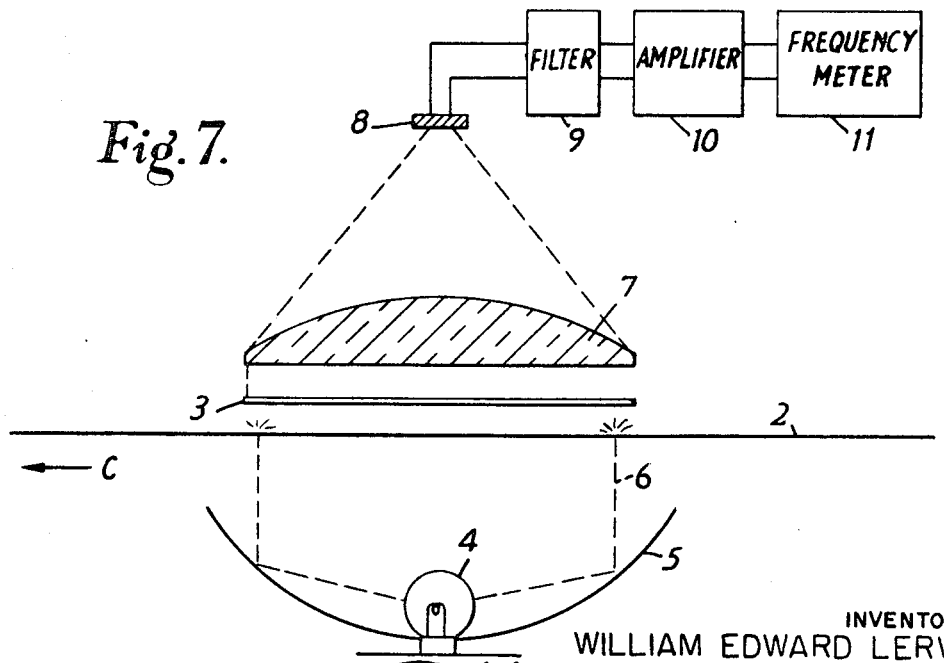

FIG. 5 shows diagrammatically the material of FIG. 2 arranged to pass beneath, but out of contact with a control member;

FIG. 6 shows the waveform of the resulting signal which might be produced, as will be described;

FIG. 7 shows from one side the sheet of material and the control member with its grating, together with other parts of apparatus;

FIG. 8 is a diagrammatic view similar to FIG. 7 but showing a modification;

FIG. 9 is a similar view but showing a still further modification.

Reference will first be made to the apparatus commencing with FIG. 7.

A source of light 4 is arranged with a mirror system 5 to produce a beam of light 6. This beam 6 projected onto a control member 3 which may have the form shown in FIG. 1. The material 2, the speed of which is required, is positioned in the beam 6 between the control member 3 and the mirror system 5; the arrow C indicates the direction of movement of the material 2 through the apparatus. The material 2 is in sheet form and the plane of the sheet is preferably normal to the beam 6 to obtain maximum penetration of light.

A plane-convex lens 7 is positioned adajacent the control member 3 to act as a light converging system for the light passing through the material 2 and member 3. The lens 7 converges the light beam passing through the member 3 onto a photo detector 8. It is not necessary for the beam to be parallel.

In effect the member 3 and lens 7 act as a window through which the light passing at a given instant is integrated by the photo detector 8. This window defines an area on the material 2 over which the radiation is integrated.

The output from the photo detector 8 is supplied to a filter 9 which separates unwanted fluctuations from a signal whose fundamental correlation frequency is selected by the control member 3. Thus the filter 9 will separate frequencies corresponding to harmonics of the signal to be measured when the control member represents a square wave.

It will also be necessary for the filter to remove low frequency noise caused by density variations in the paper having a period longer than the integration length.

Another source of frequencies which must be filtered will arise from fluctuations in the light source caused by the usual variations in such an electrical circuit.

If the filter is given a high selectivity then only a small range of speeds will be measurable due to the rapid fall in signal strength when the speed is outside this range.

A practical filter could have a pass band which allows a 10% change in the mean speed to be measured.

The control member 3 is required to modulate the beam across the beam width with a modulation of constant wavelength. Thus the member may have a variable density photographic film or other layer on a transparent plate or have apertures in an opaque plate. The grating illustrated in FIG. 1 has alternate bands of light and dark shading along its length which produce a square wave modulation in the light beam, as shown in FIG. 2. The control member may have a variable density sine wave grating or a series of circular holes which give a close approximation to a sine wave.

Figure 3:
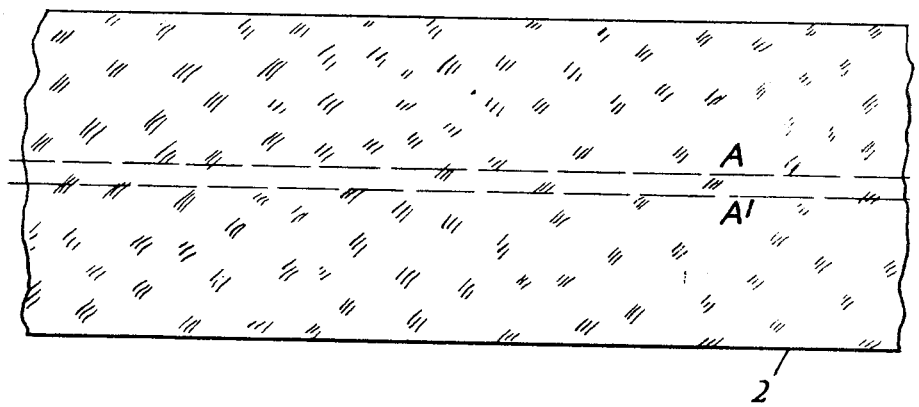
FIG. 3 shows part of a strip of paper, the flocking of the fibres in which results from the natural tendency of wood pulp fibres to collect in patches when suspended in water.

Earlier in the specification reference has been made to the applications of the invention and in FIG. 3 there is shown a strip of paper 2 with the natural flocking shown. This flocking is caused by the aggregation of the wood fibres and the flocking has a random distribution although it has been found that the flocking sub-areas are predominantly ¼ to ½ inch diameter. When a sheet of paper is passed through a light beam the beam is modulated by the flocking and the noise signal obtained is illustrated in FIG. 4.

It will be necessary to illuminate the paper only along a slit AA′ (see FIG. 3) otherwise the random distribution across the paper width will interfere.

However, if the material has random subareas of elongate form extending across the direction of movement, for example, as may be obtained from metal processing, then the area over which the correlation is performed does not require to be of slit-form and may extend to the edge of the material.

The necessary slit is preferably formed on the control member and in FIG. 9 the grating image is projected and the beam will therefore form a slit.

Figure 1:
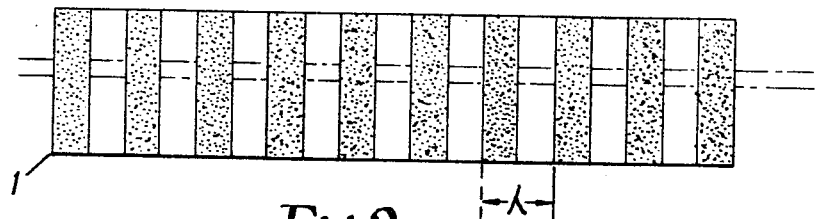
FIG. 1 represents, in plan, an accurately divided optical grating, which may be regarded as having a variable density square waveform of constant wavelength $\lambda$.

When a control member, such as that shown in FIG. 1, is interposed with the paper (see FIG. 5) an output as shown in FIG. 6 is obtained. The control member is selected to have a wavelength corresponding to the natural flocking in order to obtain the maximum signal from the system. If the material whose speed is to be measured has a grain or flocking in subareas in which all wavelengths from 0 to 00 are in equal proportions then the control member will not have a preferred wave length. It is not essential for the control member wavelength to correspond to the most predominant wavelength in the material.

As the material 2 is moved in a direction parallel to the slit AA' the light intensity will vary with time and have a fundamental frequency with a wavelength equal to the control member wavelength at the material velocity. The material velocity is calculated by inserting the frequency ($f$) given by the frequency meter in the formula $$V=\lambda f$$

where $\lambda$ is the control member wavelength.

If a window of a waveform with constant wavelength $\tau$ is cross-correlated with a continuous waveform with random wavelengths which is moved past the window at velocity V, then the fluctuation of the cross-correlation function with time will contain a frequency $f$. The relationship between V, $\tau$ and $f$ is given in the previous formula; $\tau$ is known and $f$ can be measured to allow determination of V.

The apparatus shown in FIG. 7 uses a lens and grating having a large diameter and these items may be made smaller using the modified apparatus shown in FIG. 8. In this embodiment a convex lens 12 is used to focus the beam passing through the material 2. A grating 13 of comparatively reduced size is positioned at the focus of the lens 12 so that the image of the material is projected onto the grating before the light beam falls on the photodetector 8. The following stages are the same as in FIG. 7. In this apparatus reduction in size of the grating wavelength must be allowed for when calculating the material velocity. It is not necessary for the beam of light to be parallel in this embodiment.

It will be appreciated that in order to pass the length of material through the apparatus shown in FIGS. 7 and 8 the material is unsupported over a certain distance. If the material moves in transverse direction as shown by the arrow B in FIG. 9, then the distance between the grating (presuming it is positioned as in FIG. 7) and the material will vary. This variation in distance will cause the wavelengths selected by the grating to vary. The apparatus of FIG. 9 minimises this error by positioning the control member 3 adjacent the source of a parallel beam of light. The image of the grating is thus projected onto the material and the lens 7 converges the beam onto the photodetector. This apparatus allows a permitted amount of transverse movement of the material depending on the departure from parallel of the light beam.

The examples of apparatus shown in FIGS. 7 to 9 operate by light passing through the material the speed of which is being measured but it will be appreciated that the apparatus may be modified for use with light reflected or scattered from the surface of an opaque body.

Although the present invention has been described with reference to certain embodiments and examples thereof, it will be apparent that numerous other modifications and embodiments will be derived by those skilled in the art which will fall within the true spirit and scope of the present invention.

What is claimed as new and desired to be secured by Letters Patent of the United States is:

1. A method of determining the velocity at which material moves past a station, said material being capable of amplitude modulating incident radiation, comprising the steps of:
  projecting radiation onto the material at the station thereby producing a light field whose amplitude variations along the length of a stationary surface represent characteristics of the material that are distributed in space along the direction of motion of the material;
  cross-correlating the function represented by the light field amplitude variations along the surface with a periodic function, thereby producing an integrated, time varying cross-correlation function;
  filtering the cross-correlation function to extract therefrom a frequency component having a frequency proportional to the velocity at which the material moves; and
  measuring the frequency of the extracted frequency component, whereby the measured frequency is proportional to the velocity at which the material moves.

2. A method in accordance with claim 1 wherein the cross-correlation is carried out by positioning at said surface a control member capable of amplitude modulating incident radiation in a pattern corresponding to the periodic function, and by then optically integrating the doubly modulated light by combining it into a beam whose intensity represents the integrated, time varying cross-correlation function.

3. A method in accordance with claim 2 wherein the beam is converted into an electrical signal by a photodetector, and wherein the filtering and frequency measuring steps are carried out electrically.

4. A method according to claim 2, wherein the periodic function is a square waveform.

5. A method according to claim 2, wherein the control member has a variable density and modulates by varying the amount of radiation which passes at different locations.

6. A method according to claim 1, wherein the characteristics of the material are random.

7. A method according to claim 1, wherein the characteristics of the material comprise modulation sectors and the period of the periodic function is not greater than twice the average size of said sectors.

8. A method according to claim 1, wherein the radiation is electromagnetic.

9. A method according to claim 1, wherein the wavelength of the periodic function is substantially that of the most prevalent wavelength in the material characteristics.

10. A method according to claim 1, wherein the radiation is in the visible band of electromagnetic spectrum.

11. A method of determining the velocity at which material moves past a station, said material being capable of amplitude modulating incident radiation, comprising the steps of:
  providing an amplitude modulated light field whose amplitude variations along the length of a stationary surface correspond to the fluctuations of a periodic function;
  projecting said amplitude modulated light field onto the material at the station, thereby producing a doubly amplitude modulated light field whose amplitude variations along the length of a surface represent the product of the periodic function with characteristics of the material that are distributed in space along the direction of motion of the material;
  integrating said doubly amplitude modulated light field by combining it into a single beam whose intensity represents the cross-correlation function of said periodic function with a function representing said characteristics of the material;
  filtering the cross-correlation function to extract therefrom a frequency component having a frequency proportional to the velocity at which the material moves; and
  measuring the frequency of the extracted frequency component, whereby the measured frequency is proportional to the velocity at which the material moves.

12. An apparatus for the determination of the velocity at which material moves past a station, said material being capable of amplitude modulating incident radiation, comprising:
  a source of radiation projecting onto the material at the station and thereby producing a light field whose amplitude variations along the length of a stationary surface represent characteristics of the material that are distributed in space along the direction of motion of the material;

a control member capable of amplitude modulating incident radiation in a pattern corresponding to a periodic function, said control member being positioned at said surface so as to produce a doubly modulated light field;

a photodetector having a radiation input and an electrical output;

optical means for projecting said doubly modulated light field onto said photodetector so as to produce at the output of said photodetector a signal representing the cross-correlation of said periodic function with a function representing the characteristics of the material;

frequency measuring means; and filtering means connecting said photodetector output to said frequency measuring means and passing to said frequency measuring means a frequency component whose frequency is proportional to the velocity at which the material moves past the station.

13. An apparatus according to claim 12, wherein the source is an electromagnetic radiation source.

14. An apparatus according to claim 12, wherein the source is a source of visible electromagnetic radiation.

15. An apparatus according to claim 12, wherein the stationary surface is parallel to the direction of movement of the material.

16. An apparatus according to claim 12, wherein the radiation source projects a parallel beam of radiation.

17. An apparatus according to claim 12, wherein the periodic waveform is a square wave.

18. An apparatus according to claim 12, wherein the stationary surface is of slit form with its largest dimension substantially parallel to the direction of travel.

19. An apparatus according to claim 12, wherein said photodetector produces a voltage or current output in proportion to the radiation energy incident on it.

20. An apparatus for the determination of the velocity at which material moves past a station, said material being capable of amplitude modulating incident radiation, comprising:

a control member capable of amplitude modulating incident radiation in a pattern corresponding to a periodic function;

a source of radiation projecting first onto said control member and then onto the material at the station and thereby producing a light field whose variations represent the product of the periodic function with a function representing characteristics of the material that are distributed in space along the direction of motion of the material;

a photodetector having a radiation input and an electrical output;

optical means for projecting said light field onto said photodetector so as to produce at the output of said photodetector a signal representing the cross-correlation of said periodic function with a function representing the characteristics of the material;

frequency measuring means; and filtering means connecting said photodetector output to said frequency measuring means and passing to said frequency measuring means a frequency component whose frequency is proportional to the velocity at which the material moves past the station.

References Cited

UNITED STATES PATENTS

| 2,292,641 | 8/1942 | Jones | 356—28 X |
| 3,006,233 | 10/1961 | Stiles et al. | 356—28 |
| 3,111,666 | 11/1963 | Wilmotte | 343—100.7 |
| 3,117,487 | 1/1964 | Tyson | 356—28 |
| 3,387,123 | 6/1968 | Liu | 250—219 X |

RODNEY D. BENNETT, JR., Primary Examiner

H. C. WAMSLEY, Assistant Examiner

U.S. Cl. X.R.

250—219, 223; 324—70, 77